United States Patent [19]

Wanner et al.

[11] 4,276,941

[45] Jul. 7, 1981

[54] HAND-HELD POWER TOOL

[75] Inventors: Karl Wanner; Werner Lehmann; Ulrich Ranger, all of Leinfelden, Fed. Rep. of Germany

[73] Assignee: Robert Bosch GmbH, Stuttgart, Fed. Rep. of Germany

[21] Appl. No.: 66,007

[22] Filed: Aug. 13, 1979

[30] Foreign Application Priority Data

Oct. 10, 1978 [DE] Fed. Rep. of Germany ....... 2844086

[51] Int. Cl.$^3$ ...................... B23B 45/02; B25D 11/04; B25D 17/22

[52] U.S. Cl. .................................... 173/117; 173/118

[58] Field of Search ................ 173/116, 117, 118, 122

[56] References Cited

U.S. PATENT DOCUMENTS

| | | | |
|---|---|---|---|
| 3,203,490 | 8/1965 | McCarty et al. | 173/116 X |
| 3,650,336 | 3/1972 | Koehler | 173/116 X |
| 3,718,193 | 2/1973 | Wanner | 173/117 |
| 3,828,863 | 8/1974 | Bleicher et al. | 173/118 X |
| 3,926,266 | 12/1975 | Dorgnon | 173/116 X |
| 4,094,365 | 6/1978 | Wanner | 173/117 |

FOREIGN PATENT DOCUMENTS

| | | | |
|---|---|---|---|
| 2029997 | 12/1971 | Fed. Rep. of Germany | 173/122 |

*Primary Examiner*—Wm. Carter Reynolds
*Attorney, Agent, or Firm*—Michael J. Striker

[57] ABSTRACT

A hand-held power tool has a tool holder for holding a tool, a striking mechanism including a cylindrical sleeve, a drive piston reciprocable in the sleeve, and a striker actuated by the latter, and a drive motor located axially parallel with and laterally adjacent to the cylindrical sleeve. The drive motor transmits the movement to the striking mechanism through a crank drive which is a one-stage crank drive and has a drive train extending transversely to a longitudinal axis of the cylindrical sleeve. The crank drive includes a rotatable shaft, a bevel gear fixedly mounted on one end portion of the drive shaft and meshing with a drive pinion of the motor, and a crank lever mounted on the other end portion of the drive shaft and connected with the drive piston of the striking mechanism. A fan is mounted on the motor shaft and operative for aspirating air, so that air flows through the motor, then flows around the cylindrical sleeve of the striking mechanism and then discharges toward the tool holder.

14 Claims, 1 Drawing Figure

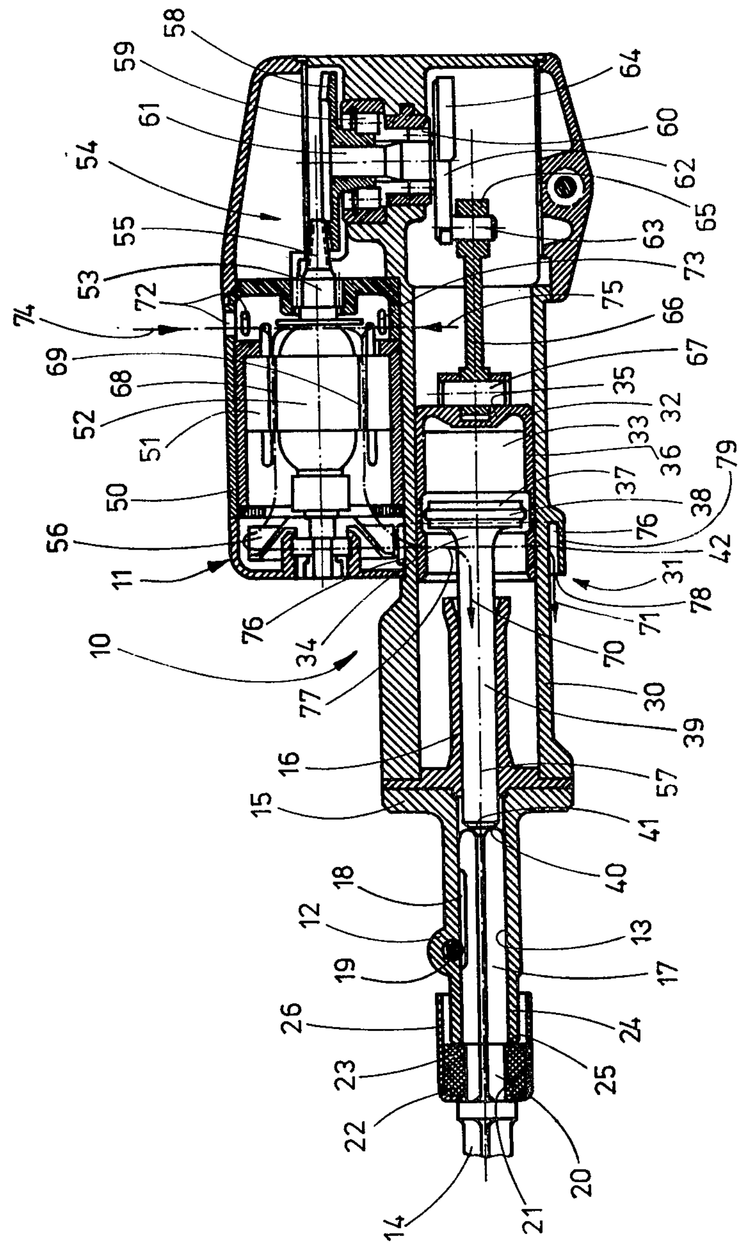
58
59
61
54
55
53
72
74
69
68
52
51
50
56
11
76
34
10
77
16
15
18
12
19
26
23
22
14
21
20
25
24
17
13
40
41
57
39
30
70
71
78
31
42
76
38
79
37
36
33
32
35
67
66
75
73
65
63
62
60
64

HAND-HELD POWER TOOL

BACKGROUND OF THE INVENTION

The present invention relates to a hand-held power tool, and more particularly to a percussion tool.

Hand-held power tools are known in the art, in which an air-cushion striking mechanism is driven from an electric motor through a crank drive. These power tools generally operate satisfactorily. However, the required convertion of the rotary motion of the electric motor into an axial reciprocating motion of the striking mechanism with the aid of drive means, such as a crank drive, is performed in relatively expensive manner. The drive means included multi-stage drives. It is necessary to provide many drive components, such as shafts, many gears and also many bearings for individual drive parts. Such a power tool is relatively complicated, susceptible to damages, expensive, heavy and thereby not convenient to handle with unfavorably located center of gravity.

SUMMARY OF THE INVENTION

Accordingly, it is an object of the present invention to provide a hand-held power tool which avoids the disadvantages of the prior art.

In keeping with these objects and with others which will become apparent hereinafter, one feature of the present invention resides, briefly stated, in a hand-held power tool—particularly a percussion-hammer—in which a crank drive for transmitting movement from a drive motor to a striking mechanism is formed as a one-stage crank drive and has a drive train extending transversely to an axial direction of the power tool, which crank drive includes a drive shaft, a bevel gear mounted on the drive shaft at the side of the drive motor and meshing with a drive pinion of the latter, and a crank lever mounted on the drive shaft at the opposite side and having a crank pin connected with a piston of the striking mechanism.

Since the crank drive has only one stage, it includes a small number of parts, namely one drive shaft which carries only two gears and requires only two bearings. The power tool is very short in the axial direction, which results in favorable location of center of gravity. During the operation, when the power tool is positioned substantially vertically, the center of gravity of the inventive power tool is located extremely low, which leads to a very easy handling of the same. Since the machine has a small number of driven parts, it is simple, sturdy and maintenance-free. Moreover, it is relatively inexpensive and has a small weight which also facilitates its handling. All these factors lead to a higher output of the power tool.

Another feature of the present invention is that the drive means is so arranged that the transmission ratio from the rotatable drive pinion of the drive motor to the reciprocating drive piston of the striking mechanism provides for delivering by the latter from 1000–1600 impacts per minute.

Still another feature of the present invention is that the drive pinion is located rearwardly of the drive piston of the striking mechanism substantially at the axial height of a connecting rod which connects the crank pin of the crank drive with the drive piston of the striking mechanism.

Yet another feature of the present invention is that a fan mounted on the shaft of the drive motor is located at the axial height of the striker, or at least at the axial height of an axial stroke of the striker.

In accordance with a further especially advantageous feature of the present invention, means is provided for guiding cooling air aspirated by a fan so that air passes through the drive motor, then flows around an outer surface of a cylindrical sleeve of the striking mechanism, and then discharges as a directional stream toward a tool holder which holds a tool. Thereby, fresh air is aspirated not in the region of the tool holder, but at the opposite side of the power tool. During a predetermined operation of the power tool, air flows from above downwardly. Flow of air as a directional stream toward the tool holder and the tool prevents dirt and dust from entering through the tool holder into the interior of the power tool and provides only minimum action of dust on the operator.

It is also possible that the striking mechanism is cooled, for example, by a portion of fresh air which is aspirated by the fan and urged through the cylindrical sleeve accommodating the striking mechanism, in the axial direction. In addition to or instead of this, the striking mechanism is cooled by air which discharges from an annular passage surrounding the outer surface of the cylindrical sleeve accommodating the striking mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing schematically shows a longitudinal section of a hand-held power tool in accordance with the present invention.

DESCRIPTION OF A PREFERRED EMBODIMENT

A hand-held power tool in accordance with the present invention is formed as a percussion hammer 10 having a housing 11. A tool holder 12 with a receiving opening 13 is mounted in the front region of the housing 11 by means of a flange 15 and screws which are not shown in the drawing. The receiving opening 13 extends coaxially with and as an extension of an inner guide sleeve 16 located in the interior of the housing 11. The receiving opening 13 is formed, for example, as a polygonal opening, particularly, a hexagonal opening. A tool 14 with a shaft portion 17 is inserted in the receiving opening 13. The shaft portion 17 of the tool 14 has a respective polygonal cross section, particularly, a hexagonal cross section. Thereby, rotation of the tool 14 relative to the tool holder 12 is prevented. The shaft portion 17 has a longitudinal groove 18. An arresting screw 19 extends transversely to the tool holder 12 and engages in the longitudinal groove 18. Thereby, axial fixation of the tool 14 against dropping out and axial limiting of movement of the tool 14 in opposite directions are attained.

An outer portion 20 of the tool 14 has a recess 21 formed as an annular groove in which a shaped part 22 of an elastic material, such as rubber, is received. The shaped part 22 is firmly held in the recess 21, but is replaceable. At the same time, it cannot displace in an axial direction. The shaped part 22 has a cross section which is, for example, formed as a thick cylindrical sleeve with rounded end faces. The shaped part 22 has an annular face 25 forming a striking face which faces toward an end face 23 of a front end portion 24 of the tool holder 21. The annular face 25 extends radially outwardly beyond the end face 23 and acts simultaneously as protection against dust. On the one hand, the shaped part 22 with its annular face 25 acts upon the end face 23 of the end portion 24 of the tool holder in striking and at the same time in damped manner, so as to form so called B-strike damping. On the other hand, it forms required axial abutment of the tool 14 relative to the percussion hammer 10 with damping of vibrations between the tool 14 and the tool holder 12.

The shaped part 22 carries a substantially cup-shaped jacket 26 which surrounds the outer peripheral surface of the former. The jacket 26 is constituted of metal or a synthetic plastic material and serves to reinforce the shaped part 22 and to prevent excessive outward bulging of the latter. The jacket 26 extends in the direction of insertion of the tool 14 toward the front end portion 24 and overlaps the latter over a relatively great axial length with a gap and in a cap-like manner. The jacket 26 serves as a cover which overlaps and protects the end portion 24 from dust, and also as an additional noise damper. As a result of this protection against dust, penetration of dirt from outside to the grease-lubricated or oil-lubricated inner parts of the percussion hammer is prevented.

The housing 11 of the percussive hammer 10 is partially formed as a tubular, longitudinally extending cylindrical sleeve 30. A striking mechanism 31 is accommodated in the interior of the latter. The striking mechanism has a reciprocating drive piston 32 and a striker 34 actuated by the drive piston 32 through an air cushion 33. The drive piston 32 and the striker 34 are arranged coaxial with one another and one after the other. The drive piston 32 is formed as a hollow piston and has a piston bottom 35, and a piston sleeve 36 which is of one piece with the piston bottom 35 and is open to the left in the drawing. The piston sleeve 36 is guided on the cylindrical sleeve 30 in sliding contact with the latter. The piston sleeve 36 serves, in turn, for receiving and guiding the striker 34 in sliding contact with the latter.

The striker is composed of a disc 37 with a sealing ring 38, and a striker shaft 39 which is of one piece with the disc and extends from the latter to the left in the drawing. The striker shaft 39 is elongated and straight, and has a diameter substantially corresponding to the diameter of the shaft portion 17 of the tool 14.

The striker shaft 39 is guided in the interior of the guide sleeve 16 in sliding contact with the latter and gets in by its end into the receiving opening 13 without contacting the polygonal surface of the latter. A free end face 40 of the striker shaft 39 cooperates, without an intermediate member as an intermediate anvil, directly with a free end 41 of the tool 14. Striking energy of the striker 34 is thereby transmitted directly to the tool 14 which results in optimum utilization of power and optimum transmission of energy.

The housing has a peripheral wall 50 which extends over an angle of 180° and is fitted onto the cylindrical sleeve 30 from above in the drawing. An electric drive motor 51, for example, a universal motor, is located inside the peripheral wall 50. The electric motor 51 has a rotor 52 which is fixed on a motor shaft 53 extending axially outwardly beyond the rotor 52 in opposite axial directions. The drive motor 51 actuates the striking mechanism 31 through a crank drive 54. As can be seen from the drawing, the drive motor 51 is located in axis-parallel relationship with and laterally adjacent to the cylindrical sleeve 30, above the latter. An end portion of the motor shaft 53 which carries a drive pinion 55 extends in a direction which is opposite to the tool holder 12, that is to the right in the drawing. An opposite end portion of the motor shaft 53, which extends to the left in the drawing, carries a fan 56, which is formed as an impeller or blower. Both end portions of the motor shaft 53 is supported in the housing.

The crank drive 54 is a one-stage drive. It is located behind the piston bottom 35 of the drive piston 32 and extends transversely to a central longitudinal axis 57 of the cylindrical sleeve 30 in form of a drive train. The latter includes a bevel gear 58 with bevelled teeth which mesh with the drive opinion 55, a drive shaft 61 which carries the bevel gear 58 for joint rotation therewith and is supported by bearing 59 and 60 in the housing, and a crank disc 62 which is mounted on an opposite end portion of the drive shaft 61 for joint rotation therewith. The crank disc 62 carries a crank pin 63, and a counterweight 64 located diametrically opposite to the latter. A connecting lug 65 of a connecting rod 66 is pivotally connected with the crank pin 63. The connecting rod 66 is connected by a piston pin 67 with a rear side of the piston bottom 65 of the drive piston 32.

The transmission ratio of the crank drive 54 from the drive pinion 55 to the translatory drive of the drive piston 32 is equal to substantially between 10 and 1. This means that the drive motor 51, as conventional for the percussion hammers rotates under load with 12,000–16,000 revolutions per minute, and the striking mechanism 31 delivers then from 1000 to 1600 strikes per minute.

The arrangement is so designed that the drive pinion 55 extends behind the drive piston 32 substantially at the axial height of the connecting rod 66. The fan 56 of the drive motor 51 is arranged substantially at the axial height of the striker 34, at least at the axial height of the stroke of the disc 37. Lines 68 and 69 with arrows identify a flow of a cooling air through the drive motor 51, and lines 70 and 71 identify a flow of air, particularly exhaust air, which passes to the outer surface 42 of the cylindrical sleeve 30 in the axial region of the striking mechanism 31 and to the tool holder 12. The fan 56 is formed as a suction fan. It aspirates outer air from the opposite region of the drive motor 51 which region is at the right in the drawing, through outer suction openings 72 and 73 in the peripheral wall 50 of the housing. This is identified by arrows 74 and 75. The aspirated outer air is sucked by the fan 56 through the drive motor 51 in the axial direction, as identified by the lines 68 and 69. Then, air discharges as exhaust air in the region of the fan radially in an annular passage 76 as identified by line 77. The annular passage 76 extends over a considerable angle, for example, more than 180° and surrounds the outer surface 42 of the cylindrical sleeve 30 so that exhaust air flows around the latter along the line 77. The annular passage 76 has axial discharge openings directed toward the tool holder 12. In the shown construction, a single circumferentially extending annular opening 78 is provided and open over the entire circumferential angle to the left. The annular passage 76 surrounds through this opening 78 the outer surface 42 of the cylindrical sleeve 30 and does not extend into the interior of the peripheral wall 50. Exhaust air flows through the annular opening 78 in direction of the arrows 70 and 71 as a directional stream, lengthwise of the outer surface 42 of the cylindrical sleeve 50 and then to the tool holder 12. This exhaust air cools thereby the striking mechanism 31. At the same time action of dust which is generated during the operation, on an operator is reduced to minimum, since exhaust air 70, 71 is supplied to the tool 14. Simultaneously, an air carpet is formed in a certain circumferential region, which air carpet prevents penetration of dirt and dust into the interior of the tool holder 12 and further into the interior of the percussion hammer 10. The annular passage 76 is located substantially at the axial height of the striker 34, at least at the axial height of the stroke of the disc 37. In the region of the cylindrical sleeve 30, the annular passage 76 is bounded by the outer surface 42 of the cylindrical sleeve 30 and by an annular wall 79 which is radially spaced from and radially outwardly surrounds the cylindrical sleeve 30. The annular wall 79 may be formed on the cylindrical sleeve 30.

The outer suction openings 72 and 72 are provided in the peripheral wall 50 of the housing substantially at the axial height of the rear region of the piston bottom 35. A part of fresh air aspirated by the fan 56, as identified by the arrows 74 and 75, is supplied as cooling air along the outer surface of the cylindrical sleeve 30, and thereby in the axial region of the striking mechanism 31, for example rearwardly of the piston bottom 35 and in axial direction lengthwise of the piston sleeve 36.

The percussive hammer in accordance with the invention is simple, sturdy, maintenance-free and not susceptible to damage. It has only few drive parts, such as only one drive shaft 61 with two bearings 59 and 60, and two gears namely the drive pinion 55 and the bevel gear 58. Drive means expenditures are very low. Thereby the percussive hammer 10 is inexpensive and light, so that it is very convenient to handle. The percussive hammber 10 is very short as a result of the inventive arrangement of the drive motor 51. This leads to a very favorable location of center of gravity during the operation. When the longitudinal axis 57 extends substantially vertically, the center of gravity is located extremely low so that handling of the percussive hammer is further improved. Simultaneously, the action of dust on the operator is reduced, and the striking mechanism 31 is cooled by fresh air and exhaust air. This increases strength and service life of the striking mechanism.

It will be understood that each of the elements described above, or two or more together, may also find a useful application in other types of constructions differing from the types described above.

While the invention has been illustrated and described as embodied in a hand-held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held power tool, comprising a tool holder arranged to hold a tool; a striking mechanism including a cylindrical sleeve having a longitudinal axis, a drive piston axially reciprocable in said cylindrical sleeve, and a striker actuated by said drive piston so as to transmit impact energy to the tool which is held in said tool holder; a drive motor located in axis-parallel relationship with and laterally adjacent to said cylindrical sleeve and having a rotatable shaft with two end portions, one of said end portions extending in a direction opposite to said tool holder and carrying a drive pinion, whereas the other of said end portions extends in a direction toward said tool holder and carries a fan; drive means for converting rotation of said shaft of said drive motor into reciprocal motion of said drive piston of said striking mechanism, said drive means being formed as a one-stage crank drive located rearwardly of said drive piston and having a drive train which extends transversely to said longitudinal axis of said cylindrical sleeve, said crank drive including a bevel gear meshing with said drive pinion of said shaft of said drive motor, a rotatable drive shaft having two end sections, on one of which end sections said bevel gear is mounted for joint rotation therewith, and a crank lever mounted on the other of said end sections of said drive shaft for joint rotation therewith and provided with a crank pin; means for connecting said drive means with said striking mechanism and including a connecting rod articulated with said drive piston of said striking mechanism at a rear side of said drive piston and having a connecting lug which is pivotally connected with said crank pin of said drive means; and means for guiding cooling air so that the latter passes through said drive motor and discharges onto an outer surface of said cylindrical sleeve in the axial region of said striking mechanism and then toward said tool holder.

2. A hand-held power tool as defined in claim 1, wherein said drive motor is an electric motor.

3. A hand-held power tool as defined in claim 1, wherein said striker is arranged in said drive piston so that the latter actuates the former through an air cushion.

4. A hand-held power tool as defined in claim 1; and further comprising a housing having a portion in which said drive shaft of said crank drive is rotatably mounted.

5. A hand-held power tool as defined in claim 1, wherein said crank lever is formed as a crank disc.

6. A hand-held power tool as defined in claim 1, wherein said drive means is so arranged that the transmission ratio from said rotatable drive pinion to said reciprocating drive piston provides for delivering substantially from 1000 to 1600 impacts per minute by said striking mechanism.

7. A hand-held power tool as defined in claim 1, wherein said drive pinion is located rearwardly of said drive piston substantially at the axial height of said connecting rod.

8. A hand-held power tool as defined in claim 1, wherein said fan of said drive motor is located substantially at the axial height of said striker.

9. A hand-held power tool as defined in claim 8, wherein said striker has a predetermined axial stroke, said fan of said drive motor is located substantially at the axial height of said axial stroke of said striker.

10. A hand-held power tool as defined in claim 1, wherein said air guiding means includes at least one suction opening formed near said drive motor at an opposite side from said fan so that cooling air is aspirated through said suction opening and passes through said drive motor in an axial direction of the latter, an annular passage extending over a considerable angle around the outer surface of said cylindrical sleeve so that air flows around the latter, and an outlet opening communicating with said annular passage and being open in the axial direction toward said tool holder so that air discharges from said annular passage toward said tool holder through said outlet opening, as a directional stream.

11. A hand-held power tool as defined in claim 10, wherein said suction opening is located at the axial height of a rear axial region of said drive piston, said air guiding means including means for urging air aspirated by said fan to flow as a cooling air into an axial region of said striking mechanism.

12. A hand-held power tool as defined in claim 10, wherein said annular passage is located at the axial height of said striker of said striking mechanism.

13. A hand-held power tool as defined in claim 12, wherein said striker of said striking mechanism has a predetermined axial stroke, said annular passage being located at the axial height of said axial stroke of said striker.

14. A hand-held power tool as defined in claim 13; and further comprising an annular wall radially outwardly spaced from the outer surface of said cylindrical sleeve and surrounding the latter, said annular passage being formed between said outer surface of said cylindrical sleeve and said annular wall and being completely open over its entire circumference so as to form said outlet opening.

* * * * *